May 24, 1966  M. SKOBEL  3,252,833

STRETCHABLE TAPE

Filed March 26, 1962

INVENTOR.

MAX SKOBEL

BY

*Imrie W. Smiley*

ATTORNEY

United States Patent Office 3,252,833
Patented May 24, 1966

3,252,833
STRETCHABLE TAPE
Max Skobel, Oakhurst, N.J., assignor to Stauffer Chemical Company, a corporation of Delaware
Filed Mar. 26, 1962, Ser. No. 182,189
9 Claims. (Cl. 117—231)

This invention relates to tape products having highly resilient and elastic properties at elevated temperatures and more particularly to improvements in tapes for insulating or electrical conducting purposes.

Tapes according to the present invention are the products of the improved method and apparatus set forth in my copending application Serial No. 174,092, now abandoned, filed February 19, 1962. As stated in the referenced application, insulating tapes, suitable for use in the manufacture of electrical machinery to withstand operating temperatures of 180° C. and higher, have heretofore been manufactured by preparing a glass fabric as an inner strengthening ply having an organopolysiloxane elastomer applied thereto by dipping or calendering. These known processes are slow because of unduly lengthy drying times required for the siloxane gel and its necessary solvent, and are complicated for additional reasons which add to their expense.

Where uniform taping of machinery elements around sharp corners or uneven surfaces is required, the glass fabric has been formed as a stretchable, bias woven sheet which is easily subject to unraveling and requires a binder for retaining the angularly directed threads in place during the silicone coating and curing operations. The binder is usually applied in a solvent and must be dried in a separate oven before application of the silicone. Subsequently the retaining means must be mechanically or chemically broken or dissolved adding to the expense of an already complex process.

In all known processes for making insulating tapes a very wide, coated sheet is first produced, for economy. The wide sheet is subsequently cut into narrow strips of useable width. The cutting leaves the inner fabric exposed at the side edges of the tape, an undesirable feature which permits arcing over at the edges of the tape and promotes unraveling of the fabric strands within the tape.

In the above referenced, copending application a number of improvements in the method and apparatus for making stretchable tape are fully disclosed. These need not be repeated in this application relating to the tape product, but for purposes of explanation as to the manner of fabricating the tape, a preferred method comprises weaving a web of useable width and of longitudinally disposed, parallel, sinuous fibers interlocked by longitudinal, straight fibers; forcing plastic insulating material through a pair of longitudinally spaced extrusion orifices against one side of said web and one side of a belt, both the web and belt being pressed towards the extrusion orifices by at least one freely moving pressure member to form an impregnating coating on one side of the web and a coating on one side of the belt; and transferring the coating on the belt to the uncoated side of the web. After the transfer, the coated web is heated to cure the plastic, insulating material, and after curing the coated web is run through pairs of stretching rollers operating at different speed to stretch the tape longitudinally and break the longitudinal interlocking fibers, thereby permitting the finished tape to stretch both longitudinally and laterally. This process, more completely described in the copending application, is rapid and economical to perform, and produces the finished tape to a finished useable size, of narrow width, with the insulating coatings extending laterally beyond the back web to seal both side edges of the tape.

Various modifications of the process and apparatus are disclosed in the referenced copending application including the use of electricity conducting wires as the backing threads or web, whereby to form conducting, or resistance, tapes in which each wire thread is fully insulated from the other by the impregnating coating of insulating material. Another modification involves the elimination from the backing web of the interlocking, longitudinal fibers by directly embedding the threads or fibers in the coating layers while they are being extruded and at the same time imparting a transverse, reciprocating motion to the backing fibers to lay the fibers in parallel, longitudinal, sinuous paths. This improvement eliminates the need for weaving the backing, or reinforcing web, and still yields a finished directly useable tape product of narrow with having sealed side edges and stretchable both longitudinally and laterally.

According, it is a primary object of the present invention to provide an improved tape product which is fabricated directly to a required width ready for usage, which has both edges of the inner backing web, or fibers, sealed by an insulating, impregnating, and coating material.

It is also an object of the invention to provide a tape of the above described characteristics in which the coatings on opposite sides are of different materials, one for example being tacky and the other nontacky.

Another object of the present invention is to provide an improved tape product which embodies a backing layer to which is applied on both sides partial coatings of different insulating material, whereby one portion of one side of the finished tape may be tacky when cured and the other portion nontacky, and these portions being reversed on the opposite sides of the tape, so that the tape when rolled will not stick adjacent layers together, but when taped on an electric machine, or part, with the adjacent layers offset will cause the sticking of the tape layers to each other and to the machine part.

A further object of the invention is to provide an improved tape product in which the backing, or reinforcing, web to be impregnated is formed simply by laying a pattern of parallel, sinusoidal fibers longitudinally and interlocking said fibers with breakable threads, and the tape is completed by impregnating and coating the web, curing the plastic coating material, and uniformly stretching the tape to break the interlocking threads, whereby the finished tap is stretchable longitudinally and transversely.

Still another object of the invention is to provide an improved stretchable tape product of the above described characteristics in which the inner ply, or web of fabric, is not woven before coating but in which the individual web fibers are applied directly to a layer of the plastic and covered with a coat of plastic extruded thereon, thus avoiding the need for weaving the fabric before impregnation and coating.

Yet another object of the invention is to provide an improved tape product in which the backing fabric coated with insulating material comprises sinusoidal, longitudinal threads formed of electrical conductive material, the finished tape thereby being stretchable and useable as insulated conductor, or resistor, element.

A still further object of the invention is to provide an improved tape product of the above described characteristics which may be rapidly fabricated in an efficient and easy manner, at less expense and having improved qualities.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
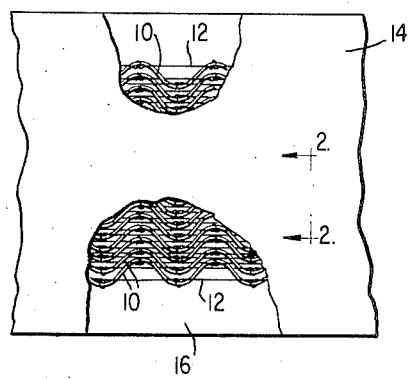
FIG. 1 is a fragmentary plan view of tape fabricated in accordance with the invention, a portion of the coating being broken away to reveal the inner ply before the locking threads are broken.
Figure 2:
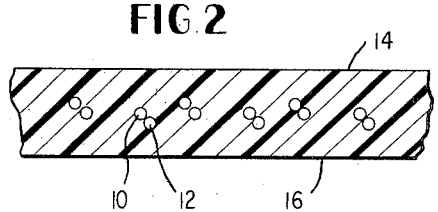
FIG. 2 is an enlarged sectional view taken along line 2—2 of FIG. 1.

Referring now to the drawings, in FIGS. 1 and 2 there is shown a preferred embodiment of the invention in which an elastic tape is formed directly to a desired and useable, narrow width without cutting, or slitting, longitudinally and comprises a fabric backing web, or strip, formed of threads 10 and 12 coated on opposite sides by layers of the insulating material 14 and 16. The layers 14 and 16 extend laterally beyond the edges of the fabric backing to seal the edges of the tape.

The fabric strip forming the backing layer or reinforcement of the tape may be woven of glass or Dacron fibers or may be formed of any woven fabric material. A preferred fabric strip is formed by glass fibers 10 laid longitudinally and parallel to form a sinuous, or serpentine, pattern which will ultimately permit stretching of the fabric both longitudinally and transversely of the finished tape. The fibers 10 are locked by longitudinal fibers 12 which pass over and under the loops of the fibers 10. If desired, each fiber 12 may be looped or knotted about the intersecting loops of fibers 10. The glass fibers 10 are preferably about 1.5–2.0 mils in diameter. Alternatively, the threads 10 may be thin wires of copper, or other suitable electrical conducting metals or alloys. The breakable, locking threads 12 are preferably formed of nylon, polyethylene, a thermoplastic or even cotton and are of smaller diameter being about 0.1–0.2 mil in diameter.

The layers 14 and 16 are formed of any suitable insulating material, such as silicone compound, extruded, in a putty-like state, by cold extrusion and at normal room ambient temperature, through a pair of extrusion orifices which extend the full width of the tape and beyond the lateral edges of the backing web 10, 12. The extrusion, as is fully described in the above referenced copending application, is performed under pressures up to 8000 p.s.i. and against the one side of the moving web and one side of a moving belt, or other transfer medium. The layer on the belt is subsequently pressed against the other side of the web, or backing layer 10, 12. The extrusion of both layers and the transfer of one layer from the belt to the second side of the fabric web is performed against a pressure plate which is forced in a direction opposite the direction of extrusion under a pressure of approximately 10–50 lbs. p.s.i. This pressure together with the extrusion rate, that is the rate of movement of the fabric backing 10, 12 past the orifices in the extrusion die, determine the thickness of the coatings 14 and 16 which may be varied if desired.

A preferred silicone elastomer material to form the coatings 14 and 16 is marketed by Dow Corning as a commercial product labeled DC 50. Other suitable silicone elastomers are fully set forth in the above referenced copending application. The impregnating coatings need not be a silicone elastomer. They may, for example, comprise a rubber, or neoprene, such as type W Neoprene marketed by the Du Pont Corporation.

After extrusion the moving fabric with the soft extrusion coatings is carried through an oven for heat curing the coatings in a conventional manner at requisite temperatures for a necessary period of time. Subsequently, the finished tape is uniformly stretched longitudinally by passing through two pairs of rollers turning at different speeds whereby to stretch the cured tape product and break the interlocking fibers 12 at the points between the loops of the fibers 10, that is between the interlocking points of the two sets of fibers. Thus the finished tape will be as pictured in FIG. 1 except that the threads 12 are broken permitting the tape to be stretched both laterally and transversely.

It is apparent from examination of FIGS. 1 and 2 that the coatings 14 and 16 enter the spaces between the fibers 10 and extend past the lateral edges of the fabric strip so as to completely seal the edges of the tape. Thus, the tape is initially formed to an exactly desired width of narrow gauge, ready for usage without further longitudinal cutting as is common in conventional manufacturing processes.

Figure 3:
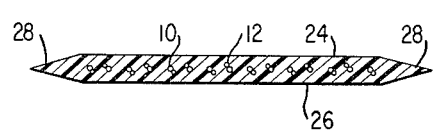
FIG. 3 is a sectional view, similar to FIG. 2, of a modified tape in which the impregnating coatings are formed with a taper at the side edges of the tape.

In FIG. 3 is shown a modified embodiment of the tape in which the backing fabric fibers 10 are embedded between impregnating coatings 24 and 26. The latter are formed by extrusion through a die orifice having special configuration to form the beveled edges 28 at each side of the tape. The bevels permit a smoother taping of electrical machinery and parts in that the overlapping portions of the tape can be of reduced thickness at the edges, thereby reducing the lumpyness of the wrapping. Other shapes and configurations of the sealing portions of the insulating coatings are obviously possible. It should be further apparent that layer 24 may differ from layer 26 in the impregnating material used, for example, layer 24 may be a nontacky, silicone plastic when cured, and 26 may be a tacky silicone when cured. One such tacky silicone compound is DC 6538 marketed by the Dow Corning Corporation.

Figure 4:
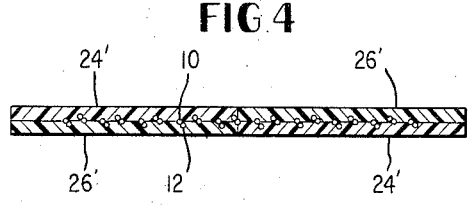
FIG. 4 is a cross sectional view of a further modified tape.
Figure 5:
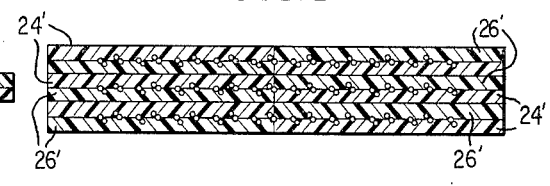
FIG. 5 is a fragmentary section through a portion of a roll of tape of the same type as illustrated in FIG. 4.
Figure 6:
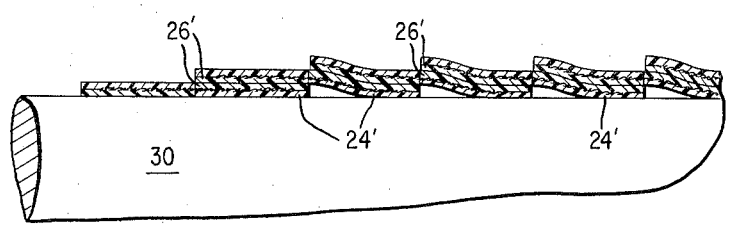
FIG. 6 is a fragmentary, sectional view showing the tape of FIG. 5 applied to the taping of an electrical machine part.

FIG. 4 illustrates a further modified tape product in which the reinforcing, fabric fibers 10, 12 are coated with a layer 26' of tacky silicone compound, when cured, along one side portion of its upper surface and a layer 24' of nontacky silicone compound, when cured, along the adjacent side of the same surface. The underside of the fabric threads 10, 12 are similarily coated with two layers 24' and 26' but reversed, so that a nontacky layer 24' at the bottom of the reinforcing layer is directly under a tacky layer 26' at the upper surface. Thus when the completed and cured tape is rolled the adjacent layers of the roll of tape will be positioned so that the tacky portions 26' are always spaced from each other by intervening layers of the nontacky portions 24' (see FIG. 5). In this manner, the tape may be rolled without an intervening separator layer; will not permanently stick adjacent layers together but may be easily unrolled to apply to an electric machine element, or cable, as shown in FIG. 6. When the cable 30 is taped with the adjacent layers offset laterally about ½ tape width, the tacky portions 26' register to strongly adhere the tape layers together.

In forming the two layers 24' and 26' on each side of the fabric inner ply, extrusion dies with orifices about half the width of the finished tape are utilized, the tacky and nontacky basic compounds being fed to the two separate dies and the fabric ply being passed through the apparatus in one direction to extrude the different layers first on one half of the tape, above and below the fabric. Then the partially coated tape is removed from the apparatus, reversed and passed through the apparatus again in the same direction to extrude the two different layers on the opposite half of the fabric ply. This method of forming the tape of FIG. 4 is fully set forth in my above referenced copending application.

Figure 7:
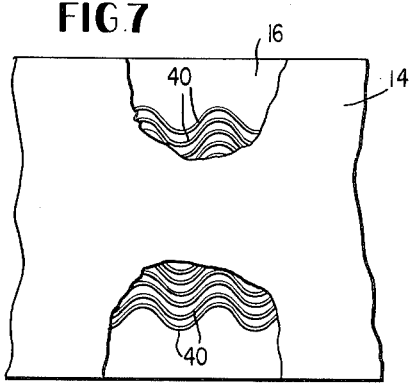
FIG. 7 is a plan view similar to FIG. 1 of a modified embodiment of the tape.

FIG. 7 illustrates a further modified tape product in which only parallel, longitudinal reinforcing fibers 40 are utilized, the interlocking fibers to hold the fabric together during the manufacture of the tape being omitted. The coating 14 is applied through an extrusion orifice against a moving belt, the fibers 40 being fed to the layer 14 between the mentioned orifice and a second orifice extruding the layer 16 against the same belt in the same direction. While being fed, the fibers 40 are reciprocated laterally of the path of movement of the belt so as to adhere to layer 14 in a sinuous pattern of parallel threads. The layer 16 extruded from the second orifice covers threads 40 as the belt passes. This method of forming the tape is more fully set forth in the above referenced copending application and need not be repeated. Because of the serpentine pattern of the fibers 40 the finished tape is stretchable both longitudinally and transversely. During the process of manufacture, no longitudinal locking threads having been used, it is unnecessary after curing of the coatings 14 and 16 to break these fibers.

Desirably, the serpentine threads 40 may be thin wires of copper, or other suitable electrical conducting metals or alloys. When such conductors are used, the finished tape product may be utilized as a stretchable electric resistance element which may be wound and stretched about an oven part having a curved contour to form a heating element. Alternatively the individual threads 40 may be utilized to connect parts of electric circuits, the stretchability in two directions of the tape permitting use of such a connector in places where a stiff connector element cannot be used.

It should be apparent from the above description that the present invention provides efficient and economical tapes, directly formed to the narrow width desired for usage without the necessity for longitudinally slitting a wider sheet, and without the disadvantage of such slitting in which the side edges of the tapes are unsealed, i.e., the reduction of insulating characteristics and the possibility of arcing over at the edges of the inner ply.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A composite elongatable product comprising in combination strand material including plural generally continuous filaments of essentially inelastic material laterally spaced apart and significantly shortened in a longitudinal direction by plural lateral contortions following a regular pattern with resilient coating material comprising silicone elastomers completely imbedding the filaments of the strand material and defining a relatively flat outer transverse cross-sectional configuration of the composite elongatable product in a manner which is generally constant along the length of the composite elongatable product, the coating material on one side of the product being in a nontacky condition along at least part of the width and the coating material on the opposite side of the product being in a pressure sensitive tacky condition along at least part of the width of the product.

2. The composite elongatable product of claim 1 wherein the coating material on one side of the product is in a nontacky condition along approximately one-half the width adjacent one edge and the coating material on the opposite side of the product is in a pressure sensitive tacky condition along approximately one-half the width adjacent the same edge of the product.

3. A composite, elongatable, longitudinally extending tape-like product comprising in combination strand material including plural generally continuous filaments of essentially inelastic material laterally spaced apart and significantly shortened in a longitudinal direction by plural lateral contortions following a regular pattern which render the strand material elongatable in a longitudinal direction, resilient coating material comprising silicone elastomers completely imbedding the filaments of the strand material and defining the outer transverse cross-sectional configuration of the elongatable product, the outer cross-sectional configuration of the product being generally constant along the length of the product and including a uniform thickness dimension and a uniform width dimension, the width dimension exceeding the thickness dimension and the opposite edges of the width of the tape-like product including longitudinally extending margins free from strand material.

4. The composite elongatable product of claim 3 wherein the lateral contortions of at least one of the generally continuous filaments of the strand material are attached to severed fragments of relatively weak longitudinal connector threads.

5. The composite elongatable product of claim 3 wherein at least one of the filaments of the strand material comprises glass fibers.

6. The composite elongatable product of claim 3 wherein at least one of the filaments of the strand material comprises an electrical conductor.

7. The composite elongatable product of claim 3 wherein the width dimension exceeds the thickness dimension many times, the thickness dimension is substantially constant across the full width to form a relatively flat tape-like product, and the plural filaments of the strand material are spaced apart across the width of the product between the edge margins.

8. The composite elongatable product of claim 7 wherein at least one portion of one side of the tape-like product is in a pressure sensitive tacky condition.

9. A composite relatively flat tape product comprising in combination strand material with coating material completely imbedding the strand material and defining the outer relatively flat transverse cross-sectional configuration of the tape product in a manner which is generally constant along the length of the product, the coating material including silicone elastomers and being on one side of the product in a pressure sensitive tacky condition along part of the width of the product and in a nontacky condition along the rest of the width of the product and being on the other side of the product in oppositely disposed tacky and nontacky conditions whereby tacky and nontacky coating material lie adjacent when the tape product is rolled for storage.

References Cited by the Examiner

UNITED STATES PATENTS

| 1,167,466 | 1/1916  | Angier      | 161—143 X   |
| 1,686,903 | 10/1928 | Eisenhardt  | 161—143 X   |
| 2,703,771 | 3/1955  | Boulware et al. | 161—173 X |
| 2,738,298 | 3/1956  | David et al. | 161—143    |
| 2,882,183 | 4/1959  | Bond et al. | 117—122     |
| 3,039,170 | 6/1962  | Marshall    | 161—78 X    |
| 3,076,726 | 2/1963  | Ault et al. | 117—68.5 X  |
| 3,146,799 | 9/1964  | Fekete      | 161—93 X    |

FOREIGN PATENTS

| 476,745 | 5/1929 | Germany. |
| 32,979  | 8/1956 | Germany. |

RICHARD D. NEVIUS, *Primary Examiner.*

W. L. JARVIS, A. GOLIAN, *Assisant Examiners.*